United States Patent
Cunkelman

[19]

[11] Patent Number: 6,070,339
[45] Date of Patent: Jun. 6, 2000

[54] MEMBRANE AIR DRYER WITH SCHEME TO REDUCE AIR LOST AS SWEEP AIR

[75] Inventor: Brian L. Cunkelman, Blairsville, Pa.

[73] Assignee: Westinghouse Air Brake Company, Wilmerding, Pa.

[21] Appl. No.: 09/178,460

[22] Filed: Oct. 23, 1998

[51] Int. Cl.$^7$ .................................................. F26B 21/06
[52] U.S. Cl. .............................. 34/79; 34/84; 95/52; 96/4
[58] Field of Search .................................. 34/72, 79, 80, 34/84, 95, 201, 209, 210, 218; 96/4, 7, 8, 10; 95/52

[56] References Cited

U.S. PATENT DOCUMENTS

| | | | |
|---|---|---|---|
| 5,013,331 | 5/1991 | Edwards et al. | 55/16 |
| 5,015,269 | 5/1991 | Garrett et al. | 55/16 |
| 5,059,374 | 10/1991 | Kruger et al. | 204/156 |
| 5,288,308 | 2/1994 | Puri et al. | 96/8 |
| 5,681,368 | 10/1997 | Rahimzadeh | 95/19 |

*Primary Examiner*—Pamela A. Wilson
*Attorney, Agent, or Firm*—James Ray & Associates

[57] ABSTRACT

A control system reduces the amount of gas lost as sweep gas from a membrane gas dryer. The membrane gas dryer is of the type that features an inlet end that receives moisture laden gas from a compressor, an outlet end from which dried gas is discharged to a pneumatic component and a drain port from which permeate sweep gas inclusive of permeate water vapor is expelled from the gas dryer. The control system includes a purge valve that is connected to the drain port of the gas dryer and a mechanism that controls the purge valve. The purge valve has a pilot port that responds to pressure by closing the purge valve thereby preventing the permeate sweep gas from exhausting to atmosphere through the drain port. The mechanism controls the purge valve such that (i) when the compressor is unloaded, the mechanism allows flow of the dried gas from the pneumatic component to pressurize the pilot port thereby closing the purge valve and preventing the permeate sweep gas from exhausting to atmosphere and (ii) when the compressor is loaded, the mechanism vents the pilot port to atmosphere thereby opening the purge valve and allowing the permeate sweep gas to exhaust to atmosphere via the drain port of the membrane gas dryer.

12 Claims, 2 Drawing Sheets

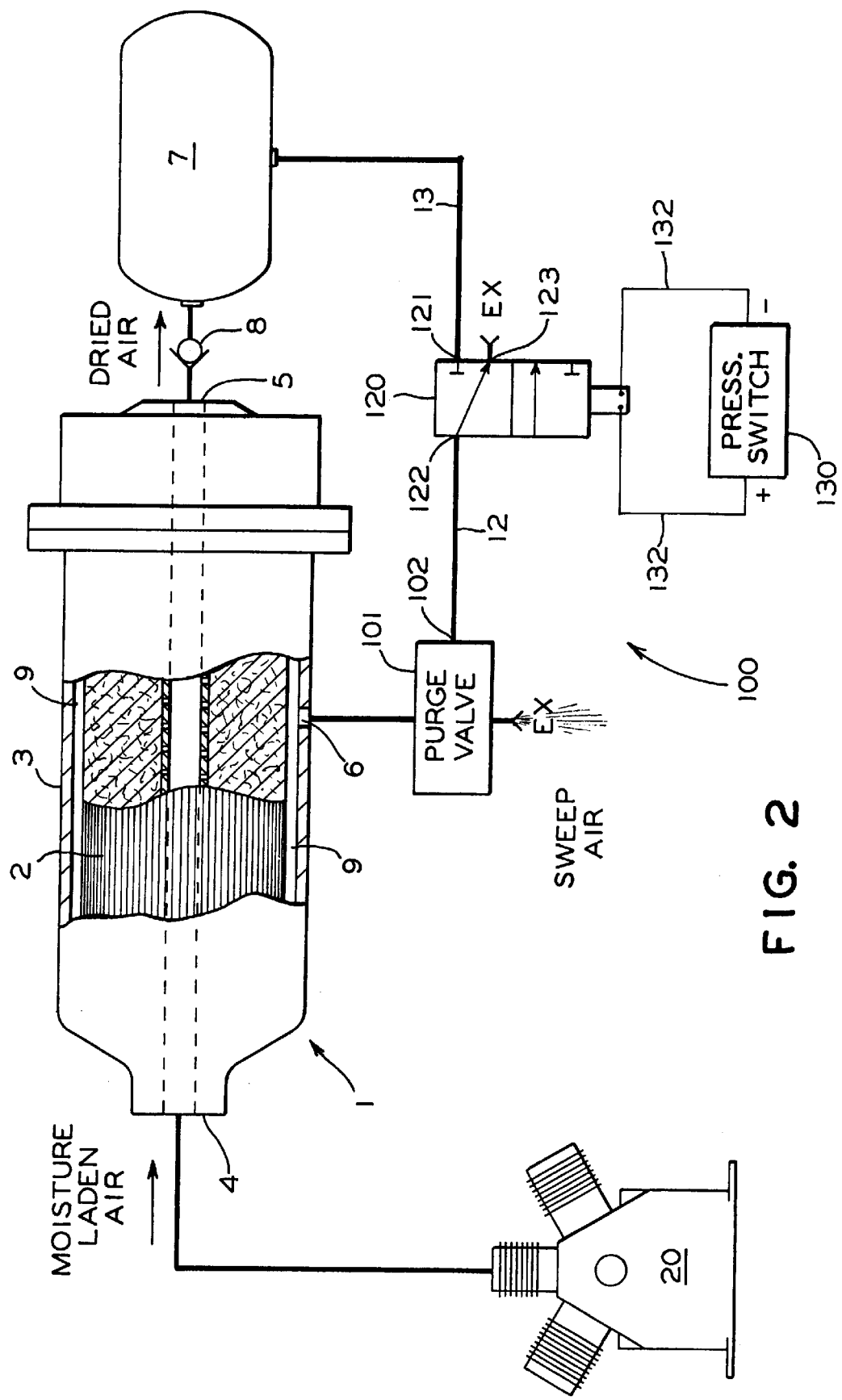

6,070,339

MEMBRANE AIR DRYER WITH SCHEME TO REDUCE AIR LOST AS SWEEP AIR

CROSS-REFERENCE TO RELATED APPLICATIONS

This application is related to the following application for patent: U.S. Ser. No. 08/989,456, entitled Combination Main Reservoir And Air System, filed Dec. 12, 1997. That patent application is assigned to the assignee of the invention(s) described and claimed below, and its teachings are incorporated into this document by reference.

FIELD OF THE INVENTION

The invention generally relates to gas dryers of the type that use semipermeable membranes to remove moisture from gas in which the moisture is suspended. More particularly, the invention relates to a system that reduces the amount of gas otherwise lost as sweep gas that is used to sweep the accumulated moisture away from the membranes of the gas dryer.

BACKGROUND OF THE INVENTION

The following background information is provided to assist the reader to understand the invention described and claimed below. Accordingly, any terms used herein are not intended to be limited to any particular narrow interpretation unless specifically stated otherwise in this document.

It is well known in th e air drying art that the amount of moisture suspended in any given volume of air is dependent on both the pressure and temperature of the air contained in that volume. This relationship between pressure, volume and temperature is defined by the various ideal gas laws of thermodynamics. When a quantity of air is compressed by reducing the volume it occupies, the amount of moisture that the compressed air can hold is reduced accordingly, assuming its temperature is held constant. The temperature of air, however, increases as the air is compressed, and this temperature increase enables the air to hold its moisture.

In most compressed air systems, such as those used in the railroad industry, temperature increases are undesirable. This is because the compressed air system has components downstream whose temperatures may be lower than that of the incoming moisture-laden compressed air. The moisture in such moisture-laden air tends to condense on the surfaces of these downstream components and contaminates the compressed air system and the pneumatic components that it supplies. Consequently, an aftercooler is typically inserted between the output of the compressor and the intake port of the air drying system to lower the temperature of the incoming compressed air. By lowering the temperature, the aftercooler causes some of the water vapor suspended in the air to precipitate out of the air in the form of liquid condensate. This liquid condensate is usually removed from the air drying system via well known devices such as separating chambers and coalescing elements. Despite the use of aftercoolers, separating chambers and coalescing elements, the compressed air will still hold some water vapor as it is difficult to remove this remaining moisture solely by mechanical means. Such mechanical means thus are often used in conjunction with one of the known air drying methods to remove this remaining water vapor. Depending on the specific application and environment in which it is used, an air drying method may be used alone, without the aforementioned mechanical means.

There are at least three prior art methods of drying air that are commonly used to remove water vapor. (1) Absorbent type air dryers use deliquescent desiccant that becomes liquid by absorbing moisture suspended in the air. Deliquescent air dryers typically have no moving parts and their costs are initially low. These dryers, however, exhibit limited dew point suppression—20° to 30° F. is common. They also require considerable maintenance, e.g., the desiccant must be periodically replaced and the system manually drained on a regular basis. (2) Absorbent type air dryers use regenerative desiccant that temporarily absorbs moisture on the surface of its molecules. The moisture temporarily accumulated by the desiccant is later removed via a stream of dried air redirected through the desiccant to purge the moisture to atmosphere. Regenerative dryers are able to achieve low dew points, but impose high costs initially and high operating costs thereafter. Their desiccant towers, in which the desiccant is housed, also must be serviced periodically. (3) Refrigeration type air dryers typically require low maintenance and impose low operating costs, but are not able to achieve low dew points. Dew points are typically limited to approximately 38° F. as a minimum to prevent freeze ups. Refrigeration type dryers are used in many industries as a first step in a multi-step drying system, e.g., before drying the air in desiccant type air dryer.

Another method of drying air employs the use of semipermeable membranes to remove moisture from the air in which the moisture is suspended. These membrane type air dryers have long been used in various industries. Such membrane type air dryers typically feature a membrane fiber bundle and a containment vessel or shell in which the bundle is encased. The membrane fiber bundle is of a type that is commercially available from Bend Research, Inc. of Bend, Oreg., U.S.A.

Regarding basic operation of a membrane type air dryer, air passes through each membrane in the bundle by a combination of (i) diffusion through the pores linking the respective surfaces of a membrane and (ii) permeation through the material of the membrane. The force that drives the separation of water vapor from air is the difference between the pressure of the air on one side of a membrane and the pressure of air on the other side of the membrane. When air is compressed, the partial pressures of the various constituents in the air each increase. Water vapor, of course, is present in the stream of compressed air that flows into the inlet of the membrane housing from the source of compressed air. The partial pressure of the water vapor in the air stream flowing in the bundle will be greater than that of the atmospheric air by a factor dependent upon the compression ratio of the compressor. This difference in the partial pressure of water vapor on the inside (higher) versus that on the outside (lower) of the membranes drives the water vapor through the membranes into the sweep air space defined between the outside of the bundle and the inner wall of the containment vessel.

The vessel in which the membrane fiber bundle is encased also features a drain hole that communicates with the sweep air space. The sweep air space serves as the conduit to transport the water vapor that has permeated through the membranes to the drain hole. It is through this drain hole that the permeated water vapor is forcibly purged from the sweep air space by "sweep air". The air stream flowing through the fiber bundle causes pressure to build within its membranes. The "sweep air" that is used to purge the permeated water vapor from the vessel originates within these pressurized membranes. Composed of light gases including even hydrogen and helium that are capable of penetrating the membranes, the sweep air leaks out of the membranes and forcibly carries with it the permeated water vapor out the drain hole in the bottom of the vessel. It is for this reason that the vessel is often referred to as the sweep air containment vessel. The dried non-permeate air that emerges from the outlet of the membrane housing, of course, flows into whatever pneumatic component(s) that the membrane air dryer is intended to supply.

The membrane type air dryer is typically incorporated within a compressed air system between the source of compressed air and a reservoir or other pneumatic component to which it supplies the compressed dried air. As shown in FIG. 1, a check valve is commonly installed between the outlet of the dryer and the inlet of the reservoir to prevent air from flowing back into the dryer when the source of compressed air is unloaded (i.e., turned off). When the source of compressed air is loaded, the compressed air that flows through the fiber bundle will cause pressure to build within the membranes as described previously. It is this pressure that is the source of the sweep air. When the source of compressed air is unloaded, however, the pressure that has accumulated within the membranes is largely lost as sweep air as it is continuously vented from the drain hole of the vessel.

It is well known that on a train locomotive the compressor is controlled so that compressed air is supplied to the air system on a periodic basis. Typically, the locomotive compressor will supply compressed air once every five minutes for a time of approximately thirty seconds. A membrane type air dryer if incorporated into the air system of a locomotive would therefore be required to operate according to this duty cycle. During the thirty second period when the compressor is loaded (i.e., the drying phase of the duty cycle), the compressed air that would flow into the fiber bundle would cause pressure to build within the membranes as described previously. When turned off during the inactive phase of its duty cycle, the compressor would be unloaded for such a long time that much, if not most all, of the pressure built up within the membranes would be lost as sweep air. Consequently, when again turned on for the next thirty second period, the compressor would spend too much of that time span on merely re-pressurizing the membranes of the fiber bundle.

The primary disadvantage to this setup is that sweep air is continuously vented from the vessel of the membrane type air dryer. It would therefore be desirable to devise a system that prevents excessive loss of air as sweep air from the sweep air containment vessel of a membrane type air dryer.

OBJECTIVES OF THE INVENTION

It is, therefore, a primary objective of the invention to provide a control system for a membrane type air dryer that reduces the amount of air lost as sweep air by which the water vapor that has passed through the membranes of the air dryer is swept away into the atmosphere.

Another objective is to reduce the time that the compressor must take to repressurize the membranes of a membrane type air dryer during the drying phase of its duty cycle.

Yet another objective is to incorporate a memory feature into a membrane type air dryer that enables the air dryer to resume its drying function generally with the same amount of internal air pressure that it had when the drying function was last stopped.

In addition to the objectives and advantages listed above, various other objectives and advantages will become more readily apparent to persons skilled in the relevant art from a reading of the detailed description section of this document. These other objectives and advantages will become particularly apparent when the detailed description is considered along with the attached drawings and with the appended claims.

SUMMARY OF THE INVENTION

In a presently preferred embodiment, the invention provides a control system that reduces the amount of gas lost as sweep gas from a membrane type gas dryer. The membrane gas dryer is of the type that features an inlet end that receives moisture laden gas from a compressor, an outlet end from which dried gas is discharged to a pneumatic component and a drain port from which permeate sweep gas inclusive of permeate water vapor is expelled from the gas dryer. The control system includes a purge valve that is connected to the drain port of the gas dryer and a means for controlling the purge valve. The purge valve has a pilot port that responds to pressure by closing the purge valve thereby preventing the permeate sweep gas from exhausting to atmosphere through the drain port. The means for controlling controls the purge valve such that (i) when the compressor is unloaded, the dried gas from the pneumatic component is allowed to flow to and pressurize the pilot port thereby closing the purge valve and preventing the permeate sweep gas from exhausting into the atmosphere and (ii) when the compressor is loaded, the pilot port is vented into the atmosphere thereby opening the purge valve and allowing the permeate sweep gas to exhaust into the atmosphere via the drain port of the membrane type gas dryer.

BRIEF DESCRIPTION OF THE DRAWINGS

FIG. 2 is a schematic view of a membrane type air dryer in the compressed air system of a locomotive incorporating the control system according to the invention.

DETAILED DESCRIPTION OF THE INVENTION

Figure 1:
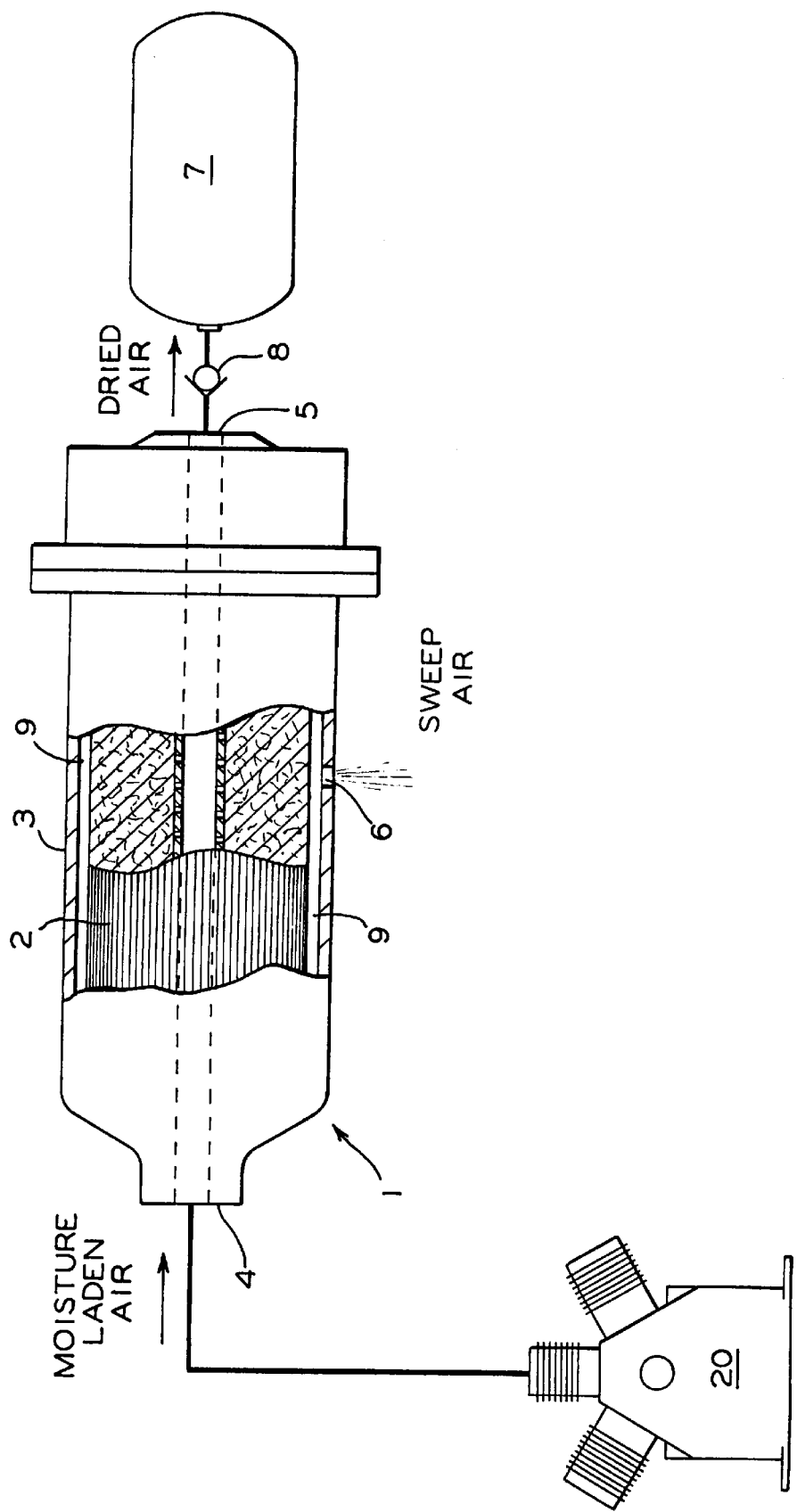
FIG. 1 is a schematic view of a membrane type air dryer within the compressed air system of a train locomotive.

Before describing the invention in detail, the reader is advised that, for the sake of clarity and understanding, identical components having identical functions have been marked where possible with the same reference numerals in each of the Figures provided in this document.

FIG. 1 illustrates one way in which to incorporate a membrane type air dryer within the compressed air system of a railroad locomotive. The membrane type air dryer 1 features a membrane fiber bundle 2 encased within a containment vessel 3. During the drying phase of the aforementioned duty cycle, the inlet end 4 of the membrane type air dryer 1 receives moisture-laden air from a compressor 20 either directly or indirectly via other air drying components situated between the compressor and the membrane air dryer. Due to the incoming air stream, pressure quickly builds in the membranes of the fiber bundle 2. The sweep air leaks through the membranes carrying with it the permeate water vapor into the sweep air space 9 of vessel 3. From the drain port 6, the sweep air inclusive of the permeate water vapor is expelled into the atmosphere. From the outlet end 5 of the air dryer, dried non-permeate air is discharged to a reservoir 7 or other suitable pneumatic components. Such pneumatic components may include the main reservoir on the locomotive or other known tanks such as the auxiliary or emergency reservoirs long used in the railroad industry.

FIG. 1 also shows a check valve 8 installed between the outlet end 5 of the dryer and the inlet of reservoir 7. The check valve 8 prevents dried air from flowing back into the dryer when the locomotive compressed air system is in the inactive phase of its duty cycle. During this inactive phase, the pressure that had built up within the membranes of the fiber bundle 2 during the previous drying phase continues to drop because sweep air continues to leak through the membranes and into the atmosphere via drain port 6 of the sweep air containment vessel 3. As the duty cycle is typically set at thirty seconds of drying once every five minutes, the inactive phase is much longer than the drying phase of the duty cycle. The membranes of the fiber bundle 2 thus lose much, if not all, of their pressure during the inactive phase of the duty cycle. Too much of the next drying phase must then be devoted to repressurizing the membranes of the fiber bundle 2 before the dryer can again operate efficiently.

Referring now to a presently preferred embodiment of the invention, FIG. 2 illustrates a control system, generally designated 100, for a membrane type air dryer 1 that overcomes the deficiencies inherent in the design illustrated in FIG. 1. The control system 100 includes a purge valve 101, a magnet valve 120 and a pressure switch 130. The purge valve 101 is preferably a gas (i.e., air) piloted valve. The purge valve 101 has an inlet connected to the drain port 6 of containment vessel 3, an outlet exposed to the atmosphere and a pilot port 102. In response to a preset pressure received at pilot port 102 from interconnective pipe 12, the purge valve 101 closes communication between its inlet and outlet. When closed due to the preset pressure, the purge valve 101 prevents the permeate sweep air from exhausting into the atmosphere via drain port 6 of containment vessel 3.

Connected between interconnective pipes 12 and 13, the magnet valve 120 is a three way valve situated between the reservoir 7 and the pilot port 102 of purge valve 101. Specifically, the magnet valve 120 is connected at its supply port 121 to pipe 13 from the reservoir 7 and at its delivery port 122 to pipe 12 from the pilot port of purge valve 101. The exhaust port 123 of magnet valve 120 is open into the atmosphere. Preferably controlled by pressure switch 130 or other suitable device, the magnet valve may be commanded to assume either a normally closed (deenergized) state or an open (energized) state. FIG. 2 shows the magnet valve 120 in its normally closed state in which its delivery and exhaust ports 122 and 123 communicate. In its open state (not shown), the supply and delivery ports 121 and 122 communicate. The pressure switch 130 controls the magnet valve 120 by being responsive to the loading of the compressed air system of the locomotive.

Regarding the particulars of how purge valve 101 and magnet valve 120 are controlled, when the compressor 20 is unloaded, the pressure switch 130 energizes the magnet valve 120 via electrical lines 132. The magnet valve 120 responds by assuming the open state in which the supply and delivery ports 121 and 122 communicate. This allows the dried permeate air previously stored in reservoir 7 to flow through pipe 13, magnet valve 120 and pipe 12 to the pilot port 102 of purge valve 101. With its pilot port pressurized, the purge valve 101 closes thereby preventing the permeate sweep air from exhausting to atmosphere via drain port 6 of the sweep air containment vessel 3. The sweep air is thus retained within the sweep air containment vessel 3 when the compressed air system is unloaded. When the compressor 20 again becomes loaded, the pressure switch 130 deenergizes the magnet valve 120. The magnet valve responds by again assuming its normally closed state in which its delivery and exhaust ports 122 and 123 communicate. This allows the pilot port 102 to vent into the atmosphere through pipe 12 and the internal passageway formed in magnet valve 120 by the aligning of its delivery and exhaust ports 122 and 123. Without pressure impinging on its pilot port, the purge valve 101 opens thereby allowing the permeate sweep air to exhaust from the drain port 6 into the atmosphere.

Taken together, magnet valve 120 and pressure switch 130 may essentially be considered as a means through which to control the purge valve 101 of the invention. It should be understood that this control means, of course, could also be implemented using various other known techniques and devices in lieu of the air piloted purge valve 101, magnet valve 120 and pressure switch 130. The purge valve, for example, could take the form of a magnet valve controlled by such a pressure switch.

By itself, the magnet valve 120 is a device whose construction and operation is generally well known in the air drying art. The pressure switch itself may be of the type commonly used in the field of pneumatics. For example, it is well known that compressors are often equipped with a governor a mechanism by which to regulate automatically the operation of the compressor. This governor typically features a pressure switch of the type appropriate to this invention. When the compressor is unloaded, the pressure switch in the governor senses the unloaded state of the compressor and can provide an electrical signal that can be used to energize the magnet valve 120 of the invention.

It should be apparent that the invention could be implemented in a variety of air drying systems and need not be confined solely to railroad industry applications. It is, however, particularly well suited for use with train locomotive compressed air systems that are equipped with membrane type air dryers. This is because train compressed air systems are operated according to the aforementioned two phase duty cycle. Specifically, the control system 100 of the invention essentially endows a membrane type air dryer with a memory feature. This feature enables the air dryer to resume its next drying phase generally with the same amount of internal air pressure that it had when the previous drying phase stopped. This reduces the amount of time that the compressor must take to repressurize the membranes during the next drying phase. More significantly, it reduces the amount of air that the air dryer would otherwise lose as sweep air absent the invention.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A control system for a membrane gas dryer of the type having an inlet end for receiving moisture laden gas ultimately from a compressor, an outlet end for discharging dried gas to a pneumatic component and a drain port for expelling permeate sweep gas inclusive of permeate water vapor from said gas dryer, said control system comprising:

(a) a purge valve for said control system, connected to said drain port of said gas dryer, capable of being closed so as to prevent said permeate sweep gas from exhausting into the atmosphere via said drain port; and (b) a means for controlling said purge valve for said control system such that (i) when said compressor is unloaded, said means for controlling closes said purge valve and thereby prevents said permeate sweep gas from exhausting into the atmosphere and (ii) when said compressor is loaded, said means for controlling opens said purge valve thereby allowing said permeate sweep gas to exhaust into the atmosphere via said drain port of said gas dryer.

2. The control system for a membrane gas dryer, as claimed in claim 1, wherein (i) said purge valve is gas piloted having a pilot port that responds to pressure by closing said purge valve and (ii) said means for controlling includes:

(a) a magnet valve for interconnecting said pilot port of said purge valve and said pneumatic component when opened and for interconnecting said pilot port and atmosphere when closed; and (b) a pressure switch responsive to loading of said compressor such that (i) when said compressor is unloaded, said pressure switch energizes said magnet valve to open thereby allowing flow of said dried gas from said pneumatic component to pressurize said pilot port thereby closing said purge valve and preventing said permeate sweep gas from exhausting into the atmosphere and (ii) when said compressor is loaded, said pressure switch deenergizes said magnet valve to vent said pilot port into the atmosphere thereby opening said purge valve and allowing said permeate sweep gas to exhaust into the atmosphere via said drain port.

3. The control system for a membrane gas dryer, as claimed in claim 2, wherein said pneumatic component is a main reservoir.

4. The control system for a membrane gas dryer, as claimed in claim 1, wherein:

(a) said purge valve is a magnet valve that responds to energization; and (b) said means for controlling includes a pressure switch responsive to loading of said compressor such that (i) when said compressor is unloaded, said pressure switch energizes said magnet valve thereby preventing said permeate sweep gas from exhausting into the atmosphere and (ii) when said compressor is loaded, said pressure switch deenergizes said magnet valve thereby allowing said permeate sweep gas to exhaust into the atmosphere via said drain port.

5. The control system for a membrane gas dryer, as claimed in claim 4, wherein said pneumatic component is a main reservoir.

6. In a membrane gas dryer of the type having (i) an inlet end for receiving moisture laden gas ultimately from a compressor, (ii) an outlet end for discharging dried gas to a pneumatic component and (iii) a drain port for expelling permeate sweep gas inclusive of permeate water vapor, an improvement comprising:

(a) a purge valve, connected to said drain port of said gas dryer, capable of being closed so as to prevent said permeate sweep gas from exhausting into the atmosphere via said drain port; and (b) a means for controlling said purge valve such that (i) when said compressor is unloaded, said means for controlling closes said purge valve and thereby prevents said permeate sweep gas from exhausting into the atmosphere and (ii) when said compressor is loaded, said means for controlling opens said purge valve thereby allowing said permeate sweep gas to exhaust into the atmosphere via said drain port of said gas dryer.

7. The improved membrane gas dryer, as claimed in claim 6, wherein (i) said purge valve is gas piloted having a pilot port that responds to pressure by closing said purge valve and (ii) said means for controlling includes:

(a) a magnet valve for interconnecting said pilot port of said purge valve and said pneumatic component when opened and for interconnecting said pilot port and atmosphere when closed; and (b) a pressure switch responsive to loading of said compressor such that (i) when said compressor is unloaded, said pressure switch energizes said magnet valve to open thereby allowing flow of said dried gas from said pneumatic component to pressurize said pilot port thereby closing said purge valve and preventing said permeate sweep gas from exhausting into the atmosphere and (ii) when said compressor is loaded, said pressure switch deenergizes said magnet valve to vent said pilot port into the atmosphere thereby opening said purge valve and allowing said permeate sweep gas to exhaust into the atmosphere via said drain port.

8. The improved membrane gas dryer, as claimed in claim 7, wherein said pneumatic component is at least one of a main reservoir, an auxiliary reservoir and an emergency reservoir.

9. The improved membrane gas dryer, as claimed in claim 8, wherein said pneumatic component is said main reservoir.

10. The improved membrane gas dryer, as claimed in claim 6, wherein:

(a) said purge valve is a magnet valve that responds to energization; and (b) said means for controlling includes a pressure switch responsive to loading of said compressor such that (i) when said compressor is unloaded, said pressure switch energizes said magnet valve thereby preventing said permeate sweep gas from exhausting into the atmosphere and (ii) when said compressor is loaded, said pressure switch deenergizes said magnet valve thereby allowing said permeate sweep gas to exhaust into the atmosphere via said drain port.

11. The improved membrane gas dryer, as claimed in claim 10, wherein said pneumatic component is at least one of a main reservoir, an auxiliary reservoir and an emergency reservoir.

12. The improved membrane gas dryer, as claimed in claim 11, wherein said pneumatic component is said main reservoir.

* * * * *